(12) United States Patent
Anderson

(10) Patent No.: US 6,935,110 B2
(45) Date of Patent: Aug. 30, 2005

(54) TANDEM MASTER CYLINDERS FOR HYDRAULIC SYSTEMS

(75) Inventor: Robert Alan Anderson, Solihull (GB)

(73) Assignee: TRW Limited (GB)

( * ) Notice: Subject to any disclaimer, the term of this patent is extended or adjusted under 35 U.S.C. 154(b) by 0 days.

(21) Appl. No.: 10/869,487

(22) Filed: Jun. 16, 2004

(65) Prior Publication Data

US 2004/0255578 A1 Dec. 23, 2004

Related U.S. Application Data

(63) Continuation of application No. PCT/GB02/05726, filed on Dec. 17, 2002.

(30) Foreign Application Priority Data

Dec. 20, 2001 (GB) ............................................. 0130401

(51) Int. Cl.$^7$ ................................................. B60T 11/20
(52) U.S. Cl. ....................................... 60/562; 92/130 R
(58) Field of Search .................... 60/562; 92/130 R; 29/525; 403/332, 375

(56) References Cited

U.S. PATENT DOCUMENTS

| | | | | |
|---|---|---|---|---|
| 3,635,024 A | * | 1/1972 | Graham ........................ | 60/535 |
| 4,114,377 A | | 9/1978 | Shellhause ................... | 60/589 |
| 4,214,358 A | * | 7/1980 | Clerc .......................... | 29/520 |
| 4,295,336 A | * | 10/1981 | Falk ............................ | 60/562 |
| 5,431,014 A | | 7/1995 | Ishihara ....................... | 60/562 |
| 6,012,288 A | | 1/2000 | Gualdoni et al. ............. | 60/562 |
| 6,430,926 B1 | | 8/2002 | Nakano et al. .............. | 60/562 |

FOREIGN PATENT DOCUMENTS

| | | |
|---|---|---|
| DE | 94 21 291 | 9/1995 |
| GB | 977268 | 12/1964 |
| GB | 986175 | 3/1965 |
| GB | 2075631 | 11/1981 |
| GB | 2082277 | 3/1982 |

* cited by examiner

Primary Examiner—Edward K. Look
Assistant Examiner—Devin Hanan
(74) Attorney, Agent, or Firm—MacMillan, Sobanski & Todd, LLC

(57) ABSTRACT

A tandem master cylinder in which fluid under pressure is supplied to a primary outlet port from a primary pressure space in a bore between a positively actuated main piston and a floating or secondary piston, and to a secondary outlet port from a secondary pressure space between the floating or secondary piston and an end of a housing closing the bore, the position of the primary piston with respect to the secondary piston being determined by the length in a released position of a return spring which acts between the two pistons, the return spring being caged between the main position and a sleeve in abutment with the secondary piston and which is coupled to the main piston through an axially extending headed stem to determine a defined position, further in which the distal end of the stem is of a reduced diameter and a shoulder at the step in diameter defines a cutting edge, insertion of the stem into a bore in the main piston of a diameter not less of that of the distal end causing the cutting edge to cut into the material of the main piston until the defined position is reached and to key the stem to the piston at that position against withdrawal of the stem from the piston. A groove may be formed in the stem to accommodate material displaced by the cutting edge and to form a key to key the stem to the piston.

7 Claims, 3 Drawing Sheets

US 6,935,110 B2

TANDEM MASTER CYLINDERS FOR HYDRAULIC SYSTEMS

CROSS REFERENCE TO RELATED APPLICATIONS

This application is a continuation of International Application No. PCT/GB02/05726 filed Dec. 17, 2002, the disclosures of which are incorporated herein by reference, and which claimed priority to Great Britain Patent Application No. 0130401.3 filed Dec. 20, 2001, the disclosures of which are incorporated herein by reference.

BACKGROUND OF THE INVENTION

This invention relates to improvements in tandem master cylinders for hydraulic systems of the kind in which fluid under pressure is supplied to a primary outlet port from a primary pressure space in a bore between a positively actuated main piston and a floating or secondary piston, and to a secondary outlet port from a secondary pressure space between the floating or secondary piston and an end of a housing closing the bore, the position of primary piston with respect to the secondary piston being determined by the length in a released position of a return spring which act between the two pistons, the return spring being caged between the main piston and a sleeve in abutment with the secondary piston and which is coupled to the main piston through an axially extending headed stem to determine a defined position.

When the pistons are in their fully retracted positions, the two pressure spaces are in communication with a reservoir or reservoirs for fluid through recuperation valves which are controlled by the pistons, the valves being opened when the pistons are retracted and being closed when the main piston is advanced in the bore to apply the brakes.

To ensure simultaneous operation of brakes connected to each outlet port it is important that both valves close substantially simultaneously. To achieve such a simultaneous cut-off it is important that the travel of both pistons in a brake applying direction is substantially the same. Due to manufacturing tolerances the position to which the pistons have to be adjusted to achieve simultaneous cut-off has to be adjusted prior to assembly of the master cylinder.

The effective length of the return spring is therefore determined by the length of the stem and its effective length is adjusted during assembly to ensure that simultaneous operation of both valves takes place.

In GB2 075 631, which is hereby incorporated by reference herein, the effective length of the return spring is determined by coupling the stem to the main portion through a member which forms an abutment for the adjacent end of the spring and which is crimped to the stem when the effective length of the return spring has been determined. Specifically the member is crimped to engage grooves in the distal end of the stem.

DE 9421291, which is hereby incorporated by reference herein, discloses a similar construction. In this construction the stem is of hollow construction and the material of the main piston is deformed into grooves in the outer face of the hollow stem in the defined position.

In U.S. Pat. No. 6,012,288, which is incorporated by reference herein, the stem is pressed into a bore in the main piston.

SUMMARY OF THE INVENTION

According to our invention in a tandem master cylinder of the kind set forth the distal end of the stem is of a reduced diameter and a shoulder at the step in diameter defines a cutting edge, insertion of the stem into a bore in the main piston of a diameter not less of that of the distal end causing the cutting edge to cut into the material of the main piston until the defined position is reached and to key the stem to the piston at that position against withdrawal of the stem from the piston.

Preferably a groove is formed in the stem at the shoulder at the step in diameter to accommodate material of the piston displaced by the cutting edge and thereby form a key to key the stem to the piston.

The material of the stem is harder than that of the main piston to ensure that the cutting edge can displace the material of the piston into the groove.

The groove is so shaped as to facilitate insertion of the stem into the bore, and to act as a wedge to resist withdrawal of the stem in the opposite direction.

A "full groove" position is attained at a minimum depth inserted, and insertion of the stem through a further distance achieves the said defined position at which annular material in an annular ring surrounding the bore has swelled to a barrel shape.

A volume space between the distal end of the stem and the closed end of the bore is sealed against hydraulic pressure by sealing presence of the displaced material in the groove.

This setting procedure allows variable adjustment of the pressed-in depth of the stem and the sleeve which cages the return spring.

Normally the bore in the main piston is of a cylindrical outline and may be formed in a conventional manner.

Other advantages of this invention will become apparent to those skilled in the art from the following detailed description of the preferred embodiment, when read in light of the accompanying drawings.

One embodiment of our invention is illustrated in the accompanying drawings in which:

DETAILED DESCRIPTION OF THE INVENTION

Figure 1:
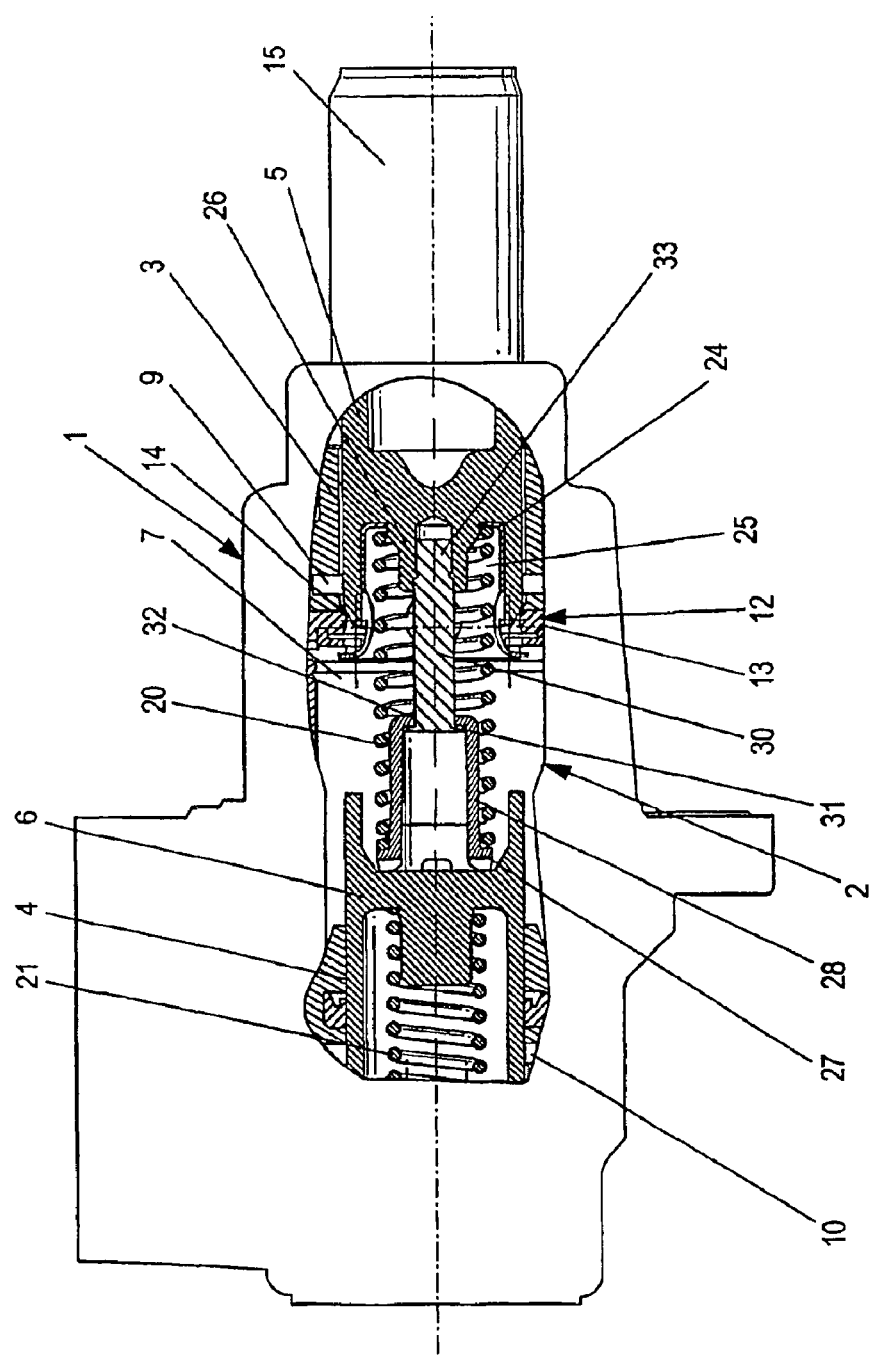
FIG. 1 is a longitudinal section through a tandem master cylinder for an hydraulic braking system.
Figure 2:
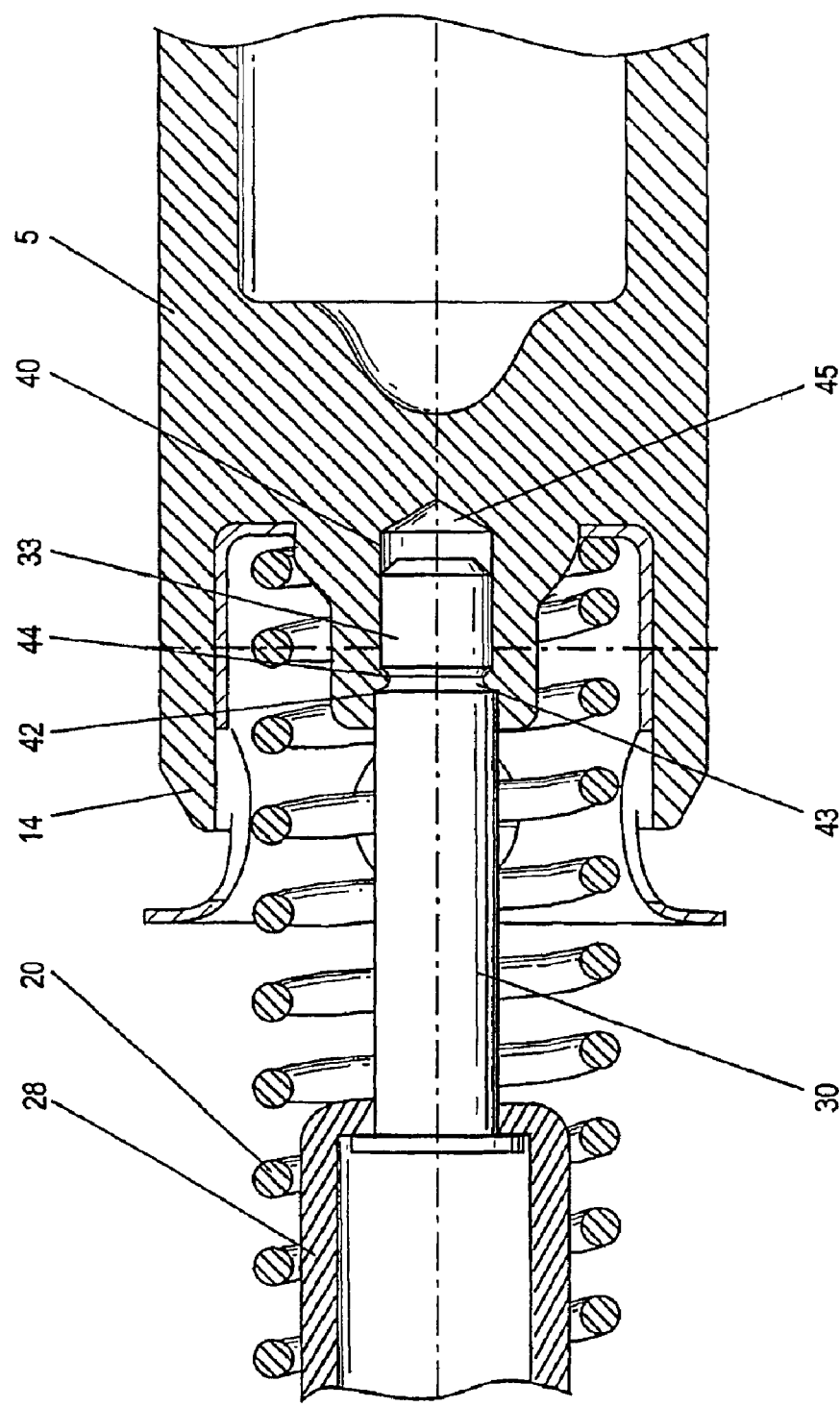
FIG. 2 is a view of a portion of FIG. 1 on an enlarged scale.

In the master cylinder illustrated in the accompanying drawings a housing 1 is provided with longitudinally extending bore 2 of stepped outline including portions 3 and 4 of equal diameters and in which work a pedal operated main piston 5 and a secondary piston 6 respectively. A primary pressure space 7 defined in a portion bore 2 between the two pistons is connected to brakes on one set of wheel of a vehicle and a secondary pressure space (not shown) and defined in the bore 2 between the secondary piston 6 and the closed end of the wall is connected to another set of brakes. A primary recuperation port 9 of the wall of the bore portion 3 in which the main piston works, and a similar secondary recuperation port 10 in the wall of the portion 4 in which the secondary piston works are connected to separate respective reservoirs for fluid, or to a single common reservoir.

When the two pistons are in the retracted position shown in FIG. 1 of the drawings each recuperation port 9,10 is in open communication with its respective pressure space through a recuperation valve of which only the primary recuperation valve 12 is illustrated. The recuperation valve 12 comprises a lip seal 13 with which a nose portion 14 at the inner of the primary piston 12 co-operates to cut off communication between the primary recuperation port 9 and the pressure space 7 as the pistons are moved inwardly in brake applying directions by operation of the pedal acting on the main piston through a push-rod 15. Further movement of the pistons in the same direction pressurises the fluid in the pressure spaces to apply the brakes.

To ensure that both sets of brakes are applied simultaneously it is essential for both recuperation valves to be closed simultaneously. This is determined by the retracted position of two pistons 5 and 6 in the off position of the brake by means of a primary return spring 20 acting between the two pistons, and secondary return spring 21 acting between the secondary piston 6 and the closed end of the bore.

In order to determined the retracted positions of both pistons, and thereby ensures simultaneous closure of both recuperation valves, the return spring 20 is "caged" so that its effective length in the retracted position of the main piston 5 can be adjusted in order to compensate for any tolerance variations during manufacture.

As illustrated the return spring 20 acts between an abutment 24 at the inner end of an inner recess 25 which surrounds a central projection 26, and an abutment 27 defined by a radial flange on a sleeve 28 of "top-hat" or thimble shaped configuration which is coupled to the main piston 5 by a stem 30 having a head 31 at its outer end for co-operation with an internal flange 32 on the sleeve 28, and a distal end 33 fixed to the main piston 5.

A blind cylindrical bore 40 is drilled into the projection 26. The distal end 33 of the stem 30 is of reduced diameter not greater than that of the bore 40 and a shoulder 42 at the step in diameter defines a cutting edge. An annular groove 43 is disposed in the distal end at the step in diameter.

Figure 3:
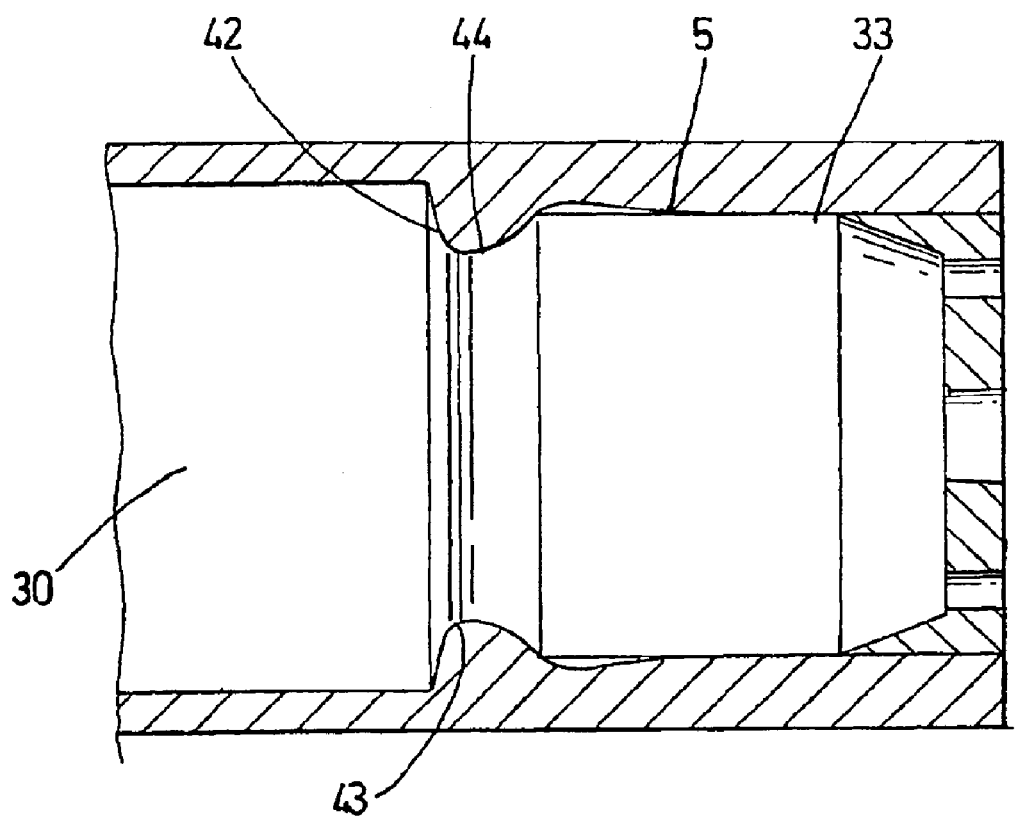
FIG. 3 is a longitudinal section through the bore and the piston on an enlarged scale.

As the stem 30 is inserted into the bore 40 the cutting edge 42 cuts the material of the piston 5 until a defined position is reached at which both the main piston 5 and the secondary piston 6 are retracted to provided equal settings for the two recuperation valves 12. The material of the piston displaced by the cutting edge 42 is accommodated within the groove 43 to form a key which keys the stem 30 to the piston 5 against movement in the opposite direction to prevent separation of the stem 30 from the main piston 5. This is illustrated in detail in FIG. 3 of the accompanying drawings.

The distance by which the stem 30 can be inserted into the bore 40 is determined by the amount of displaced material which can be accommodated in the groove 43, or, in other words, by the size of the groove 43 itself.

In the construction described above the material of the stem 30 is harder than the material of the main piston 5 to ensure that the cutting edge 42 is able to cut into the piston 5 and cause the material of the piston to flow into the groove 43. The groove 43, itself, is shaped as to facilitate insertion of the stem 30 into the bore 40, but to act as a wedge to resist withdrawal of the stem 30 from the bore 40 in the opposite direction. A minimum depth of insertion attains a "full groove" position and guarantees a high pull out force. Insertion of the stem 30 through a further distance causes annular material surrounding the bore 40 to swell into a ring 44 of a "barrel" shape, thereby to achieve the necessary adjustment to define the "defined position".

The radial thickness of the ring 44 is determined by the required push-in/pull-out load and the types of material used in the construction of the stem 30 and the piston 5.

A volume space 45 defined between the distal end 33 and the closed end of the bore 40 is sealed against hydraulic pressure to prevent trapped air from escaping into the hydraulic system. This is achieved automatically by closure of the groove 43 by the material displaced from the piston 5.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A tandem master cylinder wherein fluid under pressure is supplied to a primary outlet port from a primary pressure space in a bore between a positively actuated main piston and a secondary piston, and to a secondary outlet port from a secondary pressure space between said secondary piston and an end of a housing closing said bore, a position of said main piston with respect to the secondary piston being determined by a length in a released position of a return spring which acts between said two pistons, said return spring being caged between said main piston and a sleeve in abutment with said secondary piston and which is coupled to said main piston through an axially extending headed stem to determine a defined position, further in which distal end of said stem is of a reduced diameter to define a step in diameter and a shoulder at said step in diameter defines a cutting edge, insertion of said stem into a bore in said main piston of a diameter not less of that of said distal end causing said cutting edge to cut into material of said main piston until said defined position is reached and to key said stem to said main piston at that position against withdrawal of said stem from said main piston.

2. A tandem master cylinder as claimed in claim 1, wherein a groove is formed in said stem at a shoulder at said step in diameter to accommodate material of said main piston displaced by said cutting edge and thereby form a key to key said stem to said main piston.

3. A tandem master cylinder as claimed in claim 2, wherein material of said stem is harder than that of said main piston to ensure that said cutting edge can displace said material of said main piston into said groove.

4. A tandem master cylinder as claimed in claim 2, wherein said groove is so shaped as to facilitate insertion of said stem into said bore, and to act as a wedge to resist withdrawal of said stem in an opposite direction.

5. A tandem master cylinder as claimed in claim 2, wherein a full groove position is attained at a minimum depth inserted, and insertion of said stem through a further distance achieves said defined position at which annular material surrounding said bore has swelled to an annular ring.

6. A tandem master cylinder as claimed in claim 1, wherein in a volume space between said distal end of said stem and said closed end of said bore is sealed against hydraulic pressure by sealing presence of the displaced material in the groove.

7. A tandem master cylinder as claimed in claim 1, wherein said bore in said main piston is of a cylindrical outline.

* * * * *